United States Patent [19]

Mileti

[11] 3,727,906
[45] Apr. 17, 1973

[54] WORK HOLDING FIXTURE
[75] Inventor: Orlando Mileti, Athens, N.Y.
[73] Assignees: James A. Warren; Leonard H. Warren, Coxsackie, N.Y.; part interest to each
[22] Filed: Nov. 12, 1970
[21] Appl. No.: 88,858

[52] U.S. Cl. ............. 269/287, 269/87.3, 269/288, 279/1 TE
[51] Int. Cl. ................ B23b 5/34, B23g 3/06
[58] Field of Search .......... 269/87.3, 89, 287–8; 279/1 TE, 42, 43

[56] References Cited

UNITED STATES PATENTS

| 627,670 | 6/1899 | Jenkins | 279/1 TE |
| 2,403,768 | 7/1946 | Stoner | 279/1 TE |
| 752,260 | 2/1904 | Reed | 269/89 |
| 788,604 | 5/1905 | Schlosser I | 269/89 |
| 962,983 | 6/1910 | Schlosser II | 269/89 |
| 2,077,232 | 4/1937 | Grahek | 269/87.3 |
| 2,335,721 | 11/1943 | Zagar | 279/1 TE |
| 3,627,339 | 12/1971 | Burweger | 269/287 X |

Primary Examiner—Robert C. Riordon
Assistant Examiner—E. F. Desmond
Attorney—Walter F. Wessendorf, Jr.

[57] ABSTRACT

Discloses a work holding fixture or collet fixture, and embodiments thereof, for holding a work piece for machining operation or operations. The work holding fixture comprises a main body having a bore therethrough receiving therein a clamping element or collet having a camming surface engaging a camming surface of another element cooperating upon appropriate lever action to effect radial movement of the clamping element to clamp or grip the work piece inserted in the clamping element.

1 Claim, 11 Drawing Figures

INVENTOR.
ORLANDO MILETI

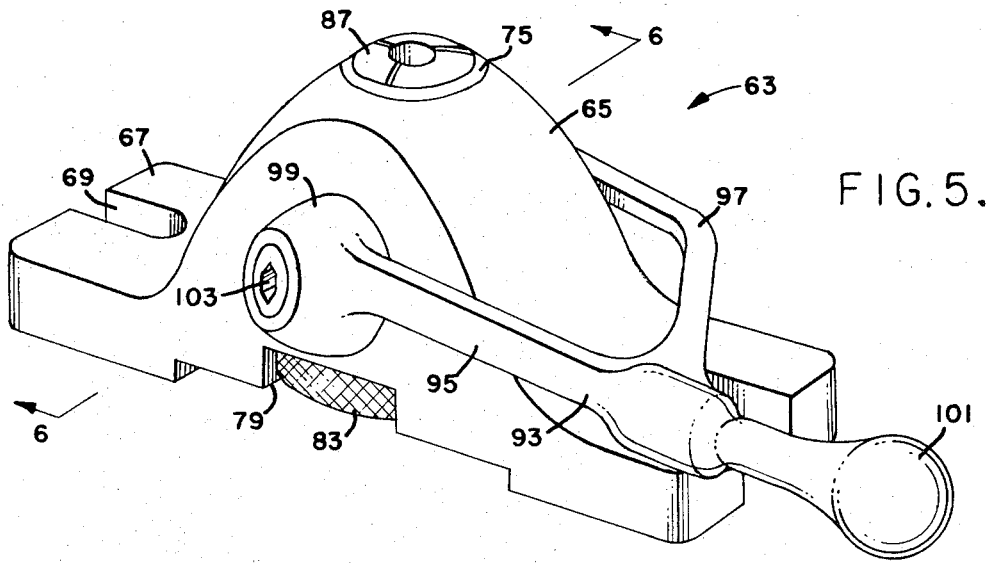

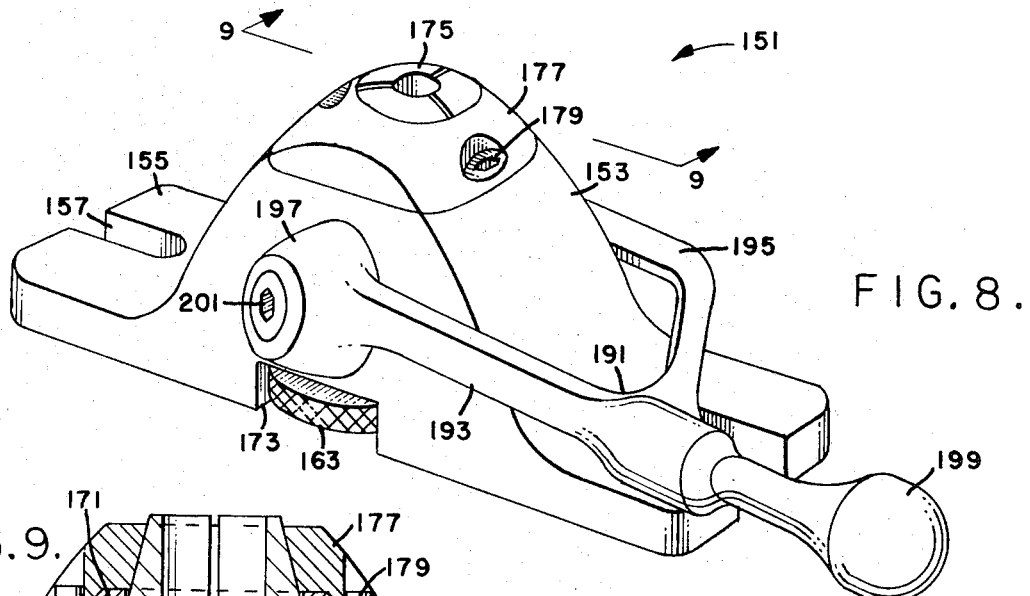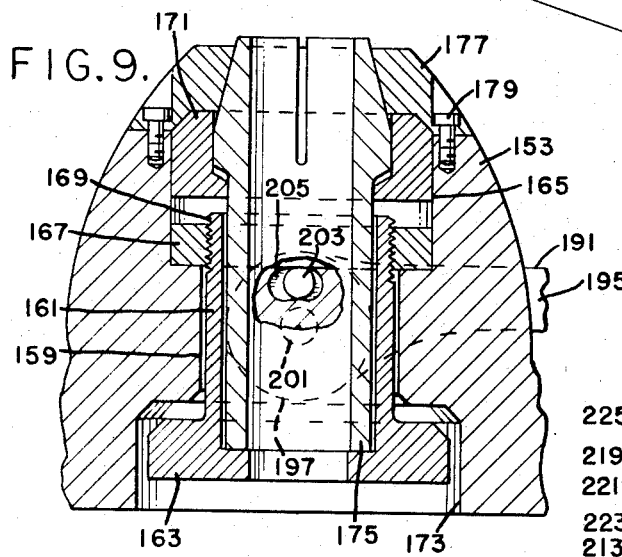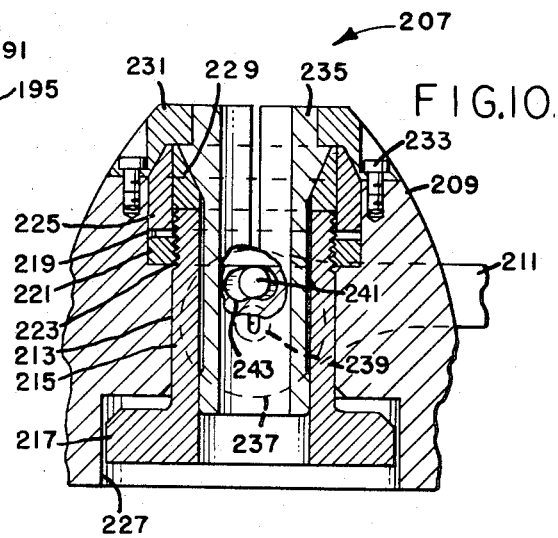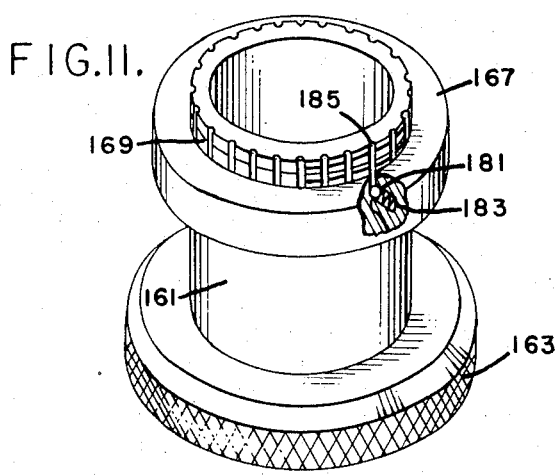

WORK HOLDING FIXTURE

This invention relates to the art of work holding or collet fixtures for holding a work piece inserted therein for performing machining operation or operations thereon.

In performing machining operations such as drilling, boring, reaming tapping, milling, etc. on a work piece, it is desired to hold such work piece securely in position in the work holding fixture during machining operation or operations, and to provide for the fast engagement and release of the work piece from the work holding fixture. The problems in the art are the need for a work holding fixture that permits pre-set adjustment of the clamping element or collet utilized for holding the work piece, the need for a work holding fixture that incorporates not only fast clamping of the work piece by the collet but also positive locking of such clamping, the need for a work holding fixture that is rigidly and simply constructed and the need for a work holding fixture that incorporates safety along with ease and simplicity of use. Accordingly, the objects of the invention are to solve the discussed problems of the art.

These objects, and other objects of the invention, should be discerned and appreciated from the detailed specification taken in conjunction with the drawings, wherein like reference numerals refer to similar parts throughout the several views, in which:

FIG. 5 is a perspective view of a vertical type work holding fixture;

FIG. 6 is a sectional view, taken along the line 6 — 6 in FIG. 5;

FIG. 7 is a sectional view of another embodiment of the invention;

FIG. 8 is a perspective view of another embodiment of the invention showing a vertical type work holding fixture;

FIG. 9 is a sectional view, taken along the line 9 — 9 in FIG. 8;

FIG. 10 is a sectional view of another embodiment of the invention; and

FIG. 11 is a perspective view of the adjusting ring and thrust bearing nut utilized in the embodiments shown in FIGS. 9 and 10.

Figure 1:
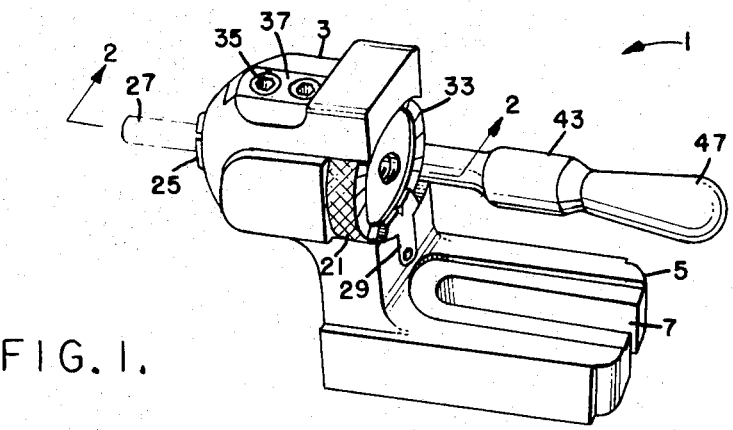
FIG. 1 is a perspective view of a horizontal type work holding fixture.

In FIG. 1 of the drawings, reference numeral 1 generally refers to the invention showing a main body 3, preferably of metal, with a base or bed plate 5 depending therefrom and provided with a bolt receiving slot 7 for securing the work holding fixture to the bed or table of the machine tool utilized for performing the machining operation or operations on the work piece 27.

A bore 9 extends through main body 3, a forward counterbore 11 receives tapered sleeve 13 forming an integral part of main body 3, rear counterbores 15 and 17 receive thrust bearing 19 and externally knurled tension adjusting nut 21, respectively, with tension adjusting nut 21 engaged with the threaded portion 23 of clamping element or conventional collet 25 positioned and disposed in bore 9, all as shown.

Figure 2:
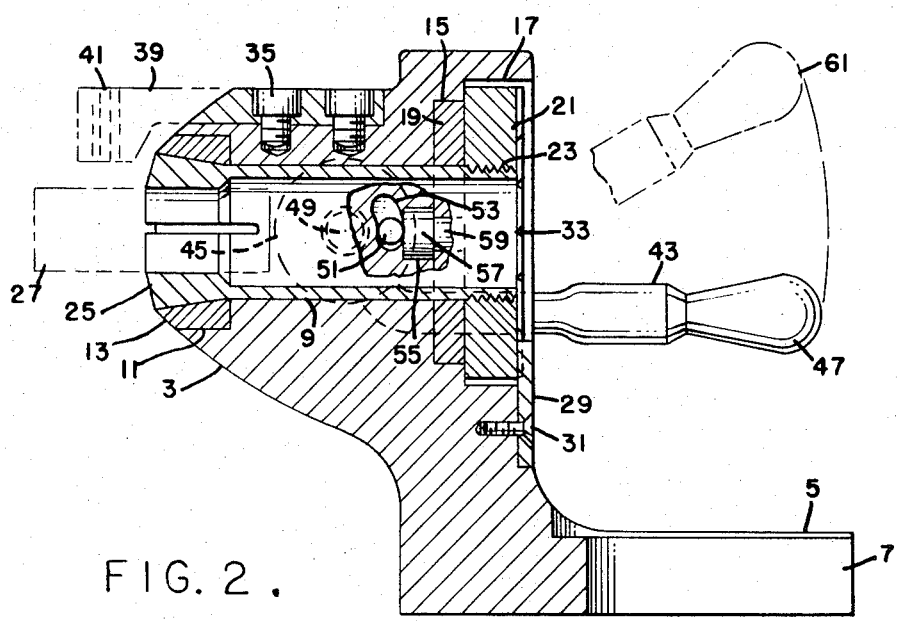
FIG. 2 is a sectional view, taken along the line 2 — 2 in FIG. 1.
Figure 3:
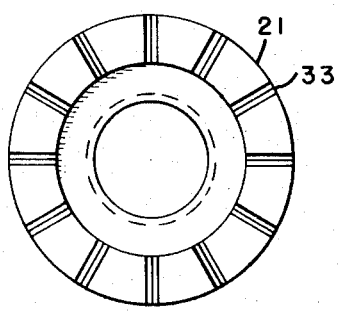
FIG. 3 is a view of the collet tension adjusting nut.

With respect to work piece 27 inserted in the forward end of clamping element 25, as shown, it should be discerned and appreciated, with reference to FIG. 2, that appropriate clockwise movement of tension adjusting nut 21 bearing against thrust bearing 19 will cause clamping element 25 to move axially to its right, and that the cooperating common camming surfaces of tapered sleeve 13 and clamping element 25 will cause the forward end of clamping element 25 to be compressed radially inwardly in relation to work piece 27 inserted therein. Spring clip 29, secured by screw 31 to the rear of main body 3, as shown, has a depending detent complemental to the radial grooves 33 formed in the embossed portion of tension adjusting nut 21 to permit of selective pre-set tension adjustment of the forward end of clamping element 25.

Figure 4:
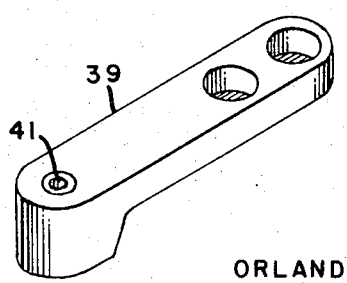
FIG. 4 is a perspective view of an accessory drill guide.

Two Allen screws 35 secure a complementally fitting template 37 to a slotted-out portion removed from the upper portion of main body 3. An accessory drill guide 39, as shown in FIG. 4, may be secured in place of removed template 37 to facilitate disposing and guiding a drill bit through drill guide hole 41 for performing drilling operation on work piece 27.

Lever 43, having a hub 45 on one end and a knob 47 on the other to facilitate manipulation thereof, is pivotally mounted on a lateral side of main body 3, as shown, by means of a step bolt 49 disposed in centrally aligned relationship through a hole centrally formed in hub 45 and engaged with a tapped hole formed in such lateral side of main body 3. As shown in the fragmentary portion of FIG. 2, a cam pin 51, carried by hub 45 in eccentric relationship to step bolt 49 and whose arcuate movement is limited by a corresponding arcuate slot 53 formed in such main body lateral side, engages a T-shaped thrust bearing stud 55 whose crossed portion 57 is received in a corresponding complemental hole formed in such main body lateral side and whose stem portion 59 is received in a corresponding complemental hole formed in thrust bearing 19.

As shown in FIG. 2, the dotted line position 61 of lever 43 denotes the open position of clamping element 25 for insertion therein of work piece 27 and whereby cam pin 51 abuts the uppermost portion of arcuate slot 53. Upon clockwise rotary movement of lever 43 to the full line position shown, the crossed portion 57 of thrust bearing stud 55 engages thrust bearing 19 engaged in abutting relationship with tension adjusting nut 21 to effect axial movement to the right of clamping element 25 resulting in the common camming surfaces of tapered sleeve 13 and clamping element 25 cooperating to effect radial compression inwardly of the forward end of clamping element 25 upon work piece 27 for retentive gripping thereof. Further clockwise rotary movement of lever 43 causes cam pin 51 to move beyond its center line position shown in full lines and into its positive lock position with further movement of cam pin 51 constrained by the abutment of cam pin 51 with the lowermost portion of arcuate slot 53.

It should be appreciated that from the dotted line position 61 of lever 43 to its full line position, the force required to move lever 43 increases and the pressure exerted thusly by cam pin 51 on thrust bearing stud 55 correspondingly increases; and that further clockwise rotary movement of lever 43 beyond the full line position of lever 43 or corresponding center line position of cam pin 51 requires decreasing force to move lever 43 and that the pressure exerted by cam pin 51 on thrust bearing stud 55 decreases correspondingly. The position of cam pin 51 beyond its center line is the positive lock position for reason of the fact, as discussed, the cam pin 51 will remain in such positive lock position because increasing force will have to be applied to lever 43 to move lever 43 upward to its full line position and beyond to unlock lever 43.

After performance of the machining operation on work piece 27, lever 43 is moved upwardly in a counterclockwise direction to its dotted line position 61 thereby releasing the forward end of clamping element 25 from its gripping retention on work piece 27 thereby allowing work piece 27 to be removed from clamping element 25.

In figs. 5 and 6, a vertical type holding fixture is shown which functions similarly to the horizontal type holding fixture described with reference to FIGS. 1 and 2.

Reference numeral 63 generally refers to the invention showing a main body 65, preferably of metal, with base or bed plates 67 provided with bolt receiving slots 69 for securing the work holding fixture 63 to the bed or table of the machine tool utilized for performing the machining operation or operations on the work piece 27.

A bore 71 extends through main body 65, a forward counterbore 73 receives tapered sleeve 75 forming an integral part of main body 65, rear counterbores 77 and 79 receive thrust bearing 81 and externally knurled tension adjusting nut 83, respectively, with tension adjusting nut 83 engaged with the threaded portion 85 of clamping element or conventional collet 87 positioned and disposed in bore 71, all as shown.

With respect to work piece 27 insertable within the forward end of clamping element 87, it should be discerned and appreciated with reference to FIG. 6, that appropriate clockwise movement of tension adjusting nut 83 bearing against thrust bearing 81 will cause clamping element 87 to move axially downward, and that the cooperating common camming surfaces of tapered sleeve 75 and clamping element 87 will cause the forward end of clamping element 87 to be compressed radially inwardly in relation to work piece 27 inserted therein. Spring clip 89, secured by a screw (not shown) to the rear of main body 65, has an upstanding detent complemental to the radial grooves 91 formed in the embossed portion of tension adjusting nut 83 to permit of selective pre-set tension adjustment of the forward end of clamping element 87.

Yoke-type lever 93, having a straight arm 95 joined by an articulated arm 97, as shown, with similar hubs 99 on the ends of arms 96 and 97, and a knob 101 on the other end of straight arm 95 to facilitate manipulation of lever 93, is pivotally mounted on the lateral flat sides of main body 65, as shown, by means of step bolts 103 disposed in centrally aligned relationship through holes centrally formed in hubs 99 and engaged with tapped holes formed in such lateral sides of main body 65.

Cam pins 105, each carried by its respective hub 99 in eccentric relationship to its respective step bolt 103 and whose arcuate movement is limited by its respective corresponding arcuate slot 107 formed in its respective main body lateral side, engage T-shaped thrust bearing studs 109 whose crossed portions 111 are received in corresponding complemental holes formed in such main body lateral sides and whose stem portions 113 are received in corresponding complemental holes formed in thrust bearing 81.

In FIG. 7 is shown a fragmentary sectional view of another embodiment of the invention respecting a vertical type work holding fixture. Reference numeral 115 generally refers to the invention showing a main body 117 similar in construction to main body 65 and which has base or bed plates (not shown) similar in construction to base or bed plates 67, and a yoke-type lever 119 similar in construction to yoke-type lever 93.

A bore 121 extends through main body 117, a forward counterbore 123 receives thrust bearing 125 and axially movable tapered sleeve 127, and rear counterbore 129 receives externally knurled tension adjusting nut 131 engaged with the threaded portion 133 of clamping element or conventional collet 135 positioned and disposed in bore 121, all as shown.

With respect to work piece insertable within the forward end of clamping element 135, it should be discerned and appreciated that appropriate clockwise movement of tension adjusting nut 131 bearing against the face of rear counterbore 129 will cause clamping element 135 to move axially downward and the cooperating common camming surfaces of clamping element 135 and tapered sleeve 127 will cause the bottom face of tapered sleeve 127 to bear against the top face of thrust bearing 125 with the common faces of thrust bearing 125 and forward counterbore 123 engaged in abutting relationship, thereby causing the forward end of clamping element 135 to be compressed radially inwardly in relation to a work piece 27 inserted therein. Spring clip 137, secured by a screw 139 to the rear of main body 117, has an upstanding detent complemental to radial grooves 141 formed in the embossed portion of tension adjusting nut 131 to permit of selective pre-set tension adjustment of the forward end of clamping element 135.

Only one arm of lever 119 is shown in FIG. 7. As shown in the further broken-away fragmentary view in FIG. 7, one of the hubs 143 of lever 119 is pivotally mounted on a lateral side of main body 117 by means of a step bolt 145 disposed in centrally aligned relationship through a hole centrally formed in hub 143 and engaged with a tapped hole formed in such lateral side of main body 117. A cam pin 147, carried by hub 143 in eccentric relationship to step bolt 145 and whose arcuate movement is limited by a corresponding arcuate slot 149 formed in such main body lateral side, engages and axially moves thrust bearing 125.

Cam pin 147 is shown in its center line position with reference to the center line of clamping element 135; and, as such, the pressure exerted by cam pin 147 on thrust bearing 125 is at its greatest. Further clockwise movement of lever 119 will cause cam pin 147 to move into its positive lock position similar to the positive lock position described with respect to cam pin 51 with reference to FIG. 2.

In FIGS. 8 and 9 is shown another embodiment of the invention respecting a vertical type work holding fixture. Reference numeral 151 generally refers to the invention showing a main body 153, preferably of metal, with base or bed plates 155 provided with bolt receiving slots 157 for securing the work holding fixture 151 to the bed or table of the machine tool utilized for performing the machining operation or operations on the work piece 27.

A bore 159 extending through main body 153 receives the open cylindrical portion 161 upstanding from knurled tension adjusting ring 163, a forward counterbore 165 receives thrust bearing nut 167 engaged with the threaded portion 169 of cylindrical portion 161 and guide sleeve 171, and rear counterbore 173 receives the tension adjusting ring 163, all as shown. The bottom face of clamping element or conventional collet 175 is in abutting relationship with the inner face of tension adjusting ring 163, as shown. Retainer cap 177 is secured by screws 179 to the upper or forward portion of main body 153.

With respect to work piece 27 insertable within the forward end of clamping element 175, it should be discerned and appreciated that appropriate clockwise movement of tension adjusting ring 163 will cause thrust bearing nut 167 to further engage the threaded portion 169 of cylindrical portion 161 causing the bottom face of thrust bearing nut 167 to bear against the bottom face of forward counterbore 167 thereby moving clamping element 175 axially upward with the cooperating common camming surfaces of clamping element 175 and retainer cap 177 causing the forward end of clamping element 175 to be compressed radially inwardly in relation to a work piece 27 inserted therein. A ball detent 181, received in a transverse hold formed in thrust bearing nut 167 and biased radially inward by spring 183, engages one of the longitudinal grooves 185 formed in the periphery of the threaded portion 169 of open cylindrical portion 161, thereby permitting selective pre-set tension adjustment to be made of the forward end of clamping element 175.

Yoke-type lever 191, having a straight arm 193 joined by an articulated arm 195, as shown, with similar hubs 197 on the ends of arms 193 and 195, and a knob 199 on the end of straight arm 193 to facilitate manipulation of lever 191, is pivotally mounted on the lateral flat sides of main body 153, as shown, by means of step bolts 201 disposed in centrally aligned relationship through holes formed in hubs 197 and engaged with tapped holes formed in such lateral sides of main body 153.

As shown by reference to the further broken-away fragmentary view in FIG. 9, cam pins 203, each carried by its respective hub 197 in eccentric relationship to its respective step bolt 201 and whose arcuate movement is limited by its respective corresponding arcuate slot 205 formed in its respective main body lateral side, engage thrust bearing nut 167.

As depicted in the broken-away fragmentary view in FIG. 9, cam pin 203 is shown in its center line position with reference to the center line of clamping element 175; and as such, the pressure exerted by cam pin 203 on thrust bearing nut 167 is at its greatest. Further clockwise rotary movement of lever 191 will cause cam pin 203 to move into its positive lock position similar to the positive lock position described with respect to cam pin 51 with reference to FIG. 2.

In FIG. 10 is shown a fragmentary sectional view of another embodiment of the invention respecting a vertical type work holding fixture. Reference numeral 207 generally refers to the invention showing a main body 209 similar in construction to main body 153 and which has base or bed plates (not shown) similar in construction to base or bed plates 155, and a yoke-type lever 211 similar to construction to yoke-type lever 191.

A bore 213 extending through main body 209 receives the open cylindrical portion 215 upstanding from knurled tension adjusting ring 217, a forward counterbore 219 receives thrust bearing nut 221 engaged with the threaded portion 223 of cylindrical portion 215 and guide sleeve 225, and rear counterbore 227 receives the tension adjusting ring 217, all as shown. Tapered sleeve 229 is axially moveable and is received within guide sleeve 225, as shown. Retainer cap 231 is secured by screws 233 to the upper or forward portion of main body 209. Clamping element or conventional collet 235 is received in disposed relationship within the open cylindrical portion 215 of tension adjusting ring 217. The structural difference between tension adjusting ring 217 and tension adjusting ring 163, described in FIG. 9, lies in the fact that structurally tension adjusting ring 217 does not have an inner face against which the bottom face of clamping element 235 abuts, whereas tension adjusting ring 163 has such an inner face against which the bottom face of clamping element 175 abuts. Thrust bearing nut 221 and the threaded portion 223 of cylindrical portion 215 incorporate the same ball detent 181, spring 183 and longitudinal grooves 185 utilized and described with reference to thrust bearing nut 167 and tension adjusting ring 163 in FIGS. 9 and 11.

With respect to work piece 27 insertable within the forward end of clamping element 235, it should be discerned and appreciated that appropriate clockwise movement of tension adjusting ring 217 will cause thrust bearing nut 221 to further engage the threaded portion 223 of cylindrical portion 215 causing the bottom face of thrust bearing nut 221 to bear against the bottom face of forward counterbore 219 and causing the upper face of clamping element 235 to bear against the bottom face of tapered sleeve 229 with the result that the cooperating common camming surfaces of clamping element 235 and tapered sleeve 229 will compress radially inwardly the forward end of clamping element 235 in relation to a work piece 27 inserted therein. The biased ball detent construction of thrust bearing nut 221 and the threaded portion 223 of cylindrical portion 215 permit selective pre-set tension adjustment to be made of the forward end of clamping element 235.

The yoke-type lever 211 and its functionally associated hubs 237, step bolts 239, cam pins 241 and arcuate slots 243 have the same construction and arrangement, and function, as was described in FIG. 9 in connection with yoke-type lever 191, hubs 197, step bolts 201, cam pins 203 and arcuate slots 205. Hence, as depicted in the broken-away fragmentary view in FIG. 10, cam pin 241 is shown in its center line position with reference to the center line of clamping element 235; and, as such, the pressure exerted by cam pin 241 on thrust bearing nut 221 is at its greatest. Further clockwise rotary movement of lever 211 will cause cam pin 241 to move into its positive lock position similar to the positive lock position described with respect to cam pin 51 with reference to FIG. 2.

The clamping elements described with respect to the invention and the several embodiments thereof are referred to as conventional collets. What is meant by a conventional collet is a clamping element generally tubular in form having a conically tapered outer surface or camming surface to or towards its forward end or the end in which the work piece is inserted. The collet has a plurality of slots in the end thereof extending rearwardly from the forward end and spaced circumferentially about the collet. Appropriate lever movement and its functionally associated cam pin or cam pins with transference of such camming action effectuate the inward radial compression of the forward end of the collet about and thereby gripping the work piece 27 inserted therein.

It is submitted that the foregoing description of the invention and the several embodiments thereof demonstrates the solving, or at the least demonstrates contributions to the solving, of the discussed problems of the art. It is submitted that the feature of the invention that permits pre-set adjustment of the clamping element or collet to be utilized for holding the work piece has been described and demonstrated. The feature of the invention that incorporates not only fast clamping of the work piece by the collet but also positive locking of such clamping has been described and demonstrated. The work piece is merely inserted in the forward end of the collet and by appropriate lever movement the work piece is gripped. Release of the work piece from the collet is similarly as fast by reverse movement. The rigidity and simplicity of the structure of the work holding fixture has been demonstrated. And the ease and simplicity of using the work holding fixture, along with its safety, has been demonstrated. With its incorporated pre-set adjustment feature of the collet, same further facilitates and allows the machine tool operator to use one hand to insert the work piece in the collet to its desired distance and clamp the inserted work piece by simple lever movement with his other hand - demonstrating the safety feature of the invention structurally incorporated in the work holding fixture.

A further problem in the art is the fact that the performance of matching operation on a work piece clamped in a collet results in bits, pieces and chips of metal removed from the work piece collecting and lodging themselves in the forward end of the collet and the interior of the work holding fixture thereby causing or contributing to the malfunction and break down of the work holding fixture, and necessitating break down time to repair, clean and reassemble the work holding fixture for proper function and operation. The sinusoidal configuration and shape of the main body of the described invention and embodiments thereof minimizes the amount of such bits, pieces and chips of machined metal that can collect and lodge themselves in the forward end of the collet and interior of the work holding fixture. Most of the machined away bits, pieces and chips of metal will fall away from the sinusoidal shaped main body of the work holding fixture of the invention and embodiments.

Having thusly described my invention, I claim:

1. A work holding fixture comprising: a main body having a a bore therethrough, a clamping element disposed in said bore and having a camming surface, said main body having a camming surface adjacent said bore cooperating with said clamping element camming surface to effect radial movement of said clamping element upon relative movement of said camming surfaces; and means to effect relative movement of said camming surfaces, said means including a lever, cam pin, thrust bearing stud, thrust bearing and tension adjusting nut; said lever having a step bolt to pivotally mount said lever on said main body, said main body having an arcuate slot, said lever carrying said cam pin, said cam pin being disposed in said arcuate slot, said thrust bearing stud, thrust bearing and tension adjusting nut being disposed in said main body, said cam pin engaging said thrust bearing stud, said thrust bearing stud engaging said thrust bearing, said thrust bearing engaging said tension adjusting nut, said clamping element having a threaded portion, and said tension adjusting nut engaging said threaded portion of said clamping element.

* * * * *